US012812754B2

(12) United States Patent
Hsu et al.

(10) Patent No.: US 12,812,754 B2
(45) Date of Patent: Nov. 24, 2026

(54) ADAPTIVE ILLUMINATION SYSTEM AND DIMMING METHOD THEREOF

(71) Applicant: WISTRON CORPORATION, New Taipei City (TW)

(72) Inventors: Chin Hao Hsu, New Taipei City (TW); Ming Chiuan Jing, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 65 days.

(21) Appl. No.: 18/808,453

(22) Filed: Aug. 19, 2024

(65) Prior Publication Data

US 2026/0006699 A1 Jan. 1, 2026

(30) Foreign Application Priority Data

Jun. 28, 2024 (TW) ................................ 113124371

(51) Int. Cl.
*H05B 45/10* (2020.01)
*H05B 47/10* (2020.01)
*H05B 47/115* (2020.01)

(52) U.S. Cl.
CPC ........... *H05B 47/115* (2020.01); *H05B 45/10* (2020.01)

(58) Field of Classification Search
CPC ........ H05B 45/10; H05B 47/00; H05B 47/10; H05B 47/105; H05B 47/115; H05B 47/125; B60Q 1/14; B60Q 1/143; B60Q 1/24; B60Q 1/249; B60Q 2300/00; B60Q 2300/05
See application file for complete search history.

(56) References Cited

U.S. PATENT DOCUMENTS

2012/0286673 A1* 11/2012 Holland ................. H05B 45/20 315/155
2016/0302275 A1* 10/2016 Newton .................... F21V 5/04
2024/0083347 A1* 3/2024 Takori .................... B60Q 1/143
2024/0306558 A1* 9/2024 Lu .......................... A01G 7/045

FOREIGN PATENT DOCUMENTS

CN 115009149 A * 9/2022 ............... B60Q 1/04
TW 201902297 A 1/2019

OTHER PUBLICATIONS

Office Action of Taiwan patent application No. 113124371 dated Jun. 6, 2025, 12 pages.

* cited by examiner

*Primary Examiner* — Thai Pham
(74) *Attorney, Agent, or Firm* — BROOKS KUSHMAN P.C.

(57) ABSTRACT

Disclosed is an adaptive illumination system including a plurality of light sources, a sensing module, and a controller. The light sources are configured to emit a plurality of illumination beams. The sensing module is configured to sense environmental information. The controller is electrically connected to the light sources and sensing module. The controller controls a brightness of each light source by a dimming function according to changes in the environmental information. The dimming function is a nonlinear function. A dimming method of the adaptive illumination systems is also disclosed.

20 Claims, 13 Drawing Sheets

ADAPTIVE ILLUMINATION SYSTEM AND DIMMING METHOD THEREOF

CROSS-REFERENCE TO RELATED APPLICATION

This application claims the priority and benefit of Taiwan application patent application Ser. No. 11/312,4371, filed on Jun. 28, 2024, also published as Taiwan Patent No. I915863B, which issued on Feb. 21, 2026. The entirety of the above-mentioned patent application is hereby incorporated by reference herein and made a part of this specification.

BACKGROUND

Technical Field

The present disclosure relates to an illumination system and a dimming method thereof, and in particular, to an adaptive illumination system and a dimming method thereof.

Description of Related Art

Adaptive illumination vehicle lights are vehicle illumination systems that are able to automatically adjust light beam. Adaptive illumination vehicle lights allow vehicle lights to illuminate the field of view in front of the driver when driving at night while preventing traffic accidents from occurring to oncoming vehicles or vehicles in front of the driver due to glares. Moreover, adaptive illumination lights are able to dim or turn off part of the light beam to avoid glares based on input from the vehicle and/or sensors, and restore illumination brightness at the appropriate timing. Therefore, adaptive illumination lights gradually become standard equipment in cars.

Existing adaptive illumination technology mainly focuses on improving the resolution of the light source or illumination to more accurately control the light beam so as for drivers to avoid hitting other vehicles. However, inappropriate brightness changes might cause a negative impact on drivers. For example, abrupt, unsmooth or fast brightness changes might cause the driver to feel flickering, which in turn causes distraction or even frightening, or the driver's visual perception might not be able to adapt in time, which increases the risk of visual fatigue and causing danger to the driver.

SUMMARY

The present disclosure provides an adaptive illumination system and a dimming method thereof, which may provide an improved dimming method.

An embodiment of the present disclosure provides an adaptive illumination system, which includes a plurality of light sources, a sensing module, and a controller. The light sources are configured to emit a plurality of illumination beams. The sensing module is configured to sense environmental information. The controller is electrically connected to the light sources and the sensing module. The controller controls a brightness of each light source through a dimming function according to changes in the environmental information. The dimming function is a nonlinear function.

An embodiment of the present disclosure provides a dimming method for an adaptive illumination system, which includes the following steps: sensing environmental information, controlling a brightness of each light source through a dimming function according to changes in the environmental information, wherein the dimming function is a nonlinear function.

Based on the above, in an embodiment of the present disclosure, the adaptive illumination system and the dimming method thereof control a brightness of each light source through a dimming function according to changes in the environmental information, and set the dimming function as a nonlinear function. In this way, using nonlinear mathematical functions allows the adaptive illumination system and the dimming method thereof to achieve nonlinear brightness control.

DESCRIPTION OF THE EMBODIMENTS

Figure 1:
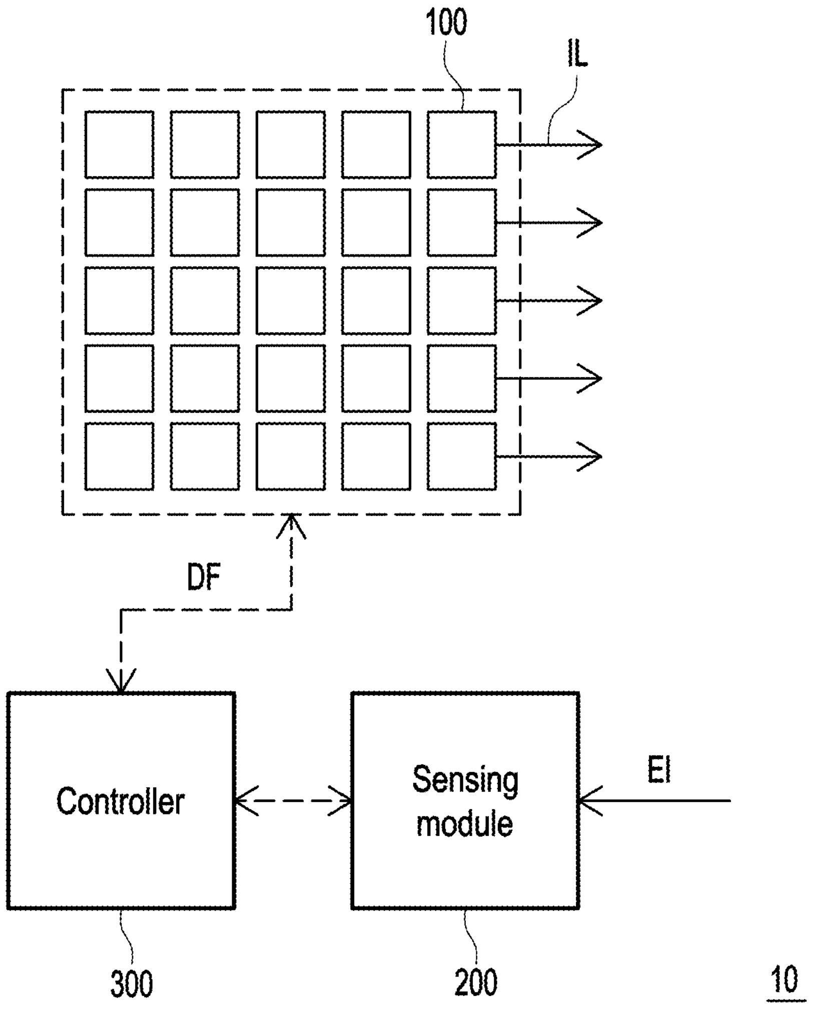
FIG. 1 is a schematic diagram of an adaptive illumination system according to an embodiment of the present disclosure.

FIG. 1 is a schematic diagram of an adaptive illumination system according to an embodiment of the present disclosure. Please refer to FIG. 1. An embodiment of the present disclosure provides an adaptive illumination system 10, which includes a plurality of light sources 100, a sensing module 200 and a controller 300. The light sources 100 are configured to emit a plurality of illumination beams IL. The sensing module 200 is configured to sense environmental information EI. The controller 300 is electrically connected to the light sources 100 and the sensing module 200. The controller 300 controls the brightness of each of the light sources 100 through the dimming function DF according to changes in the environmental information EI, wherein the dimming function DF is a nonlinear function.

In this embodiment, the light sources 100 are, for example, light-emitting diodes (LEDs) or other suitable light sources. The illumination beam IL may be visible light, but the disclosure is not limited thereto. Different light sources 100 are respectively designed to illuminate different regions in the illumination range. In an embodiment, the light sources 100 may be arranged in a matrix to accurately control the illumination range of the light sources 100.

In this embodiment, the sensing module 200 may be a camera module, a millimeter wave radar module, an ultrasonic radar module, or a light detection and ranging (LiDAR) module, but the present disclosure is not limited thereto. For example, the camera module captures an image of the environment, so that the controller 300 may recognize the environmental information EI through the image of the environment, wherein the environmental information EI includes, for example, vehicles, traffic signs, pedestrians, trees, and other objects. Moreover, the millimeter wave/ultrasonic radar module emits radio waves/ultrasonic waves and senses reflected radio waves/ultrasonic waves to measure the position and distance of objects in the environment. The LiDAR module emits a light beam and senses the reflected light beam to measure the position and distance of objects in the environment to obtain the position and distance of objects in the environment.

In this embodiment, the controller 300 includes, for example, a central processing unit (CPU), a microprocessor, a digital signal processor (DSP), a programmable controller, a programmable logic device (PLD), a graphic processing unit (GPU), or other similar devices or combinations of these devices, the present disclosure is not limited thereto. In addition, in an embodiment, each function of the controller 300 may be implemented as multiple program codes. These program codes will be stored in a memory unit, and the controller 300 will execute these program codes. Alternatively, in an embodiment, each function of the controller 300 may be implemented as one or more circuits. The present disclosure does not limit using software or hardware to implement each function of the controller 300.

In other embodiments, the adaptive illumination system 10 may be an advanced driver assistance system (ADAS). Therefore, the adaptive illumination system 10 may further include other electronic devices. For example, the adaptive illumination system 10 may include a transmission module for receiving external signals to obtain the positions of other vehicles relative to the vehicle equipped with the adaptive illumination system 10 to further provide the environmental information EI.

Figure 2A:
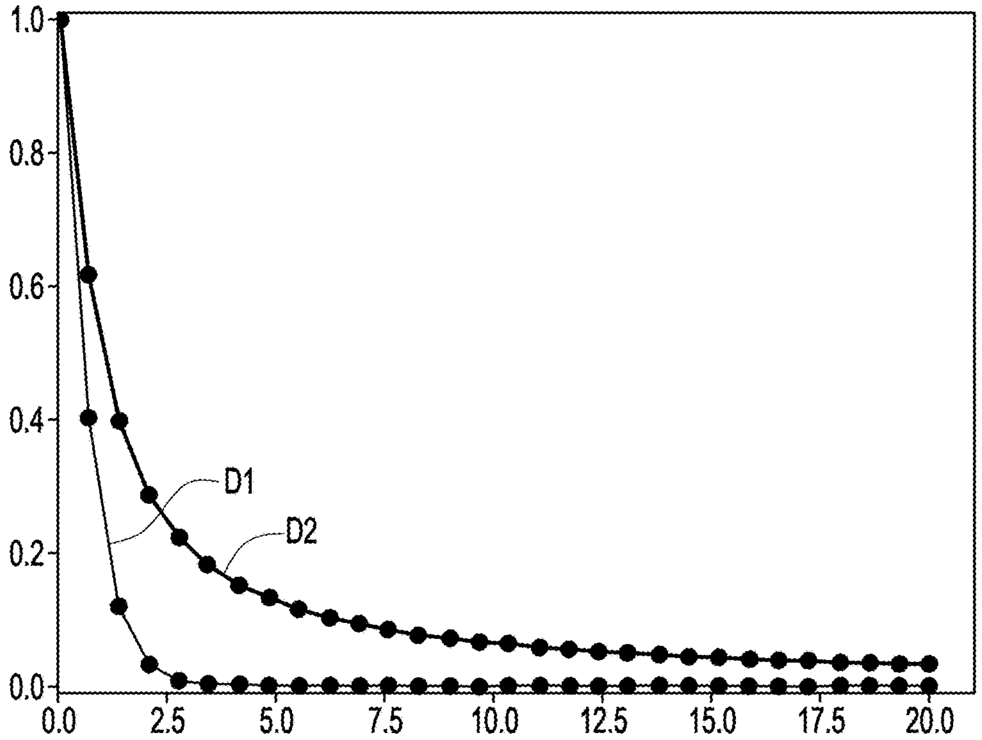
FIG. 2A is a schematic diagram of different second functions in an adaptive illumination system according to an embodiment of the present disclosure.
Figure 2B:
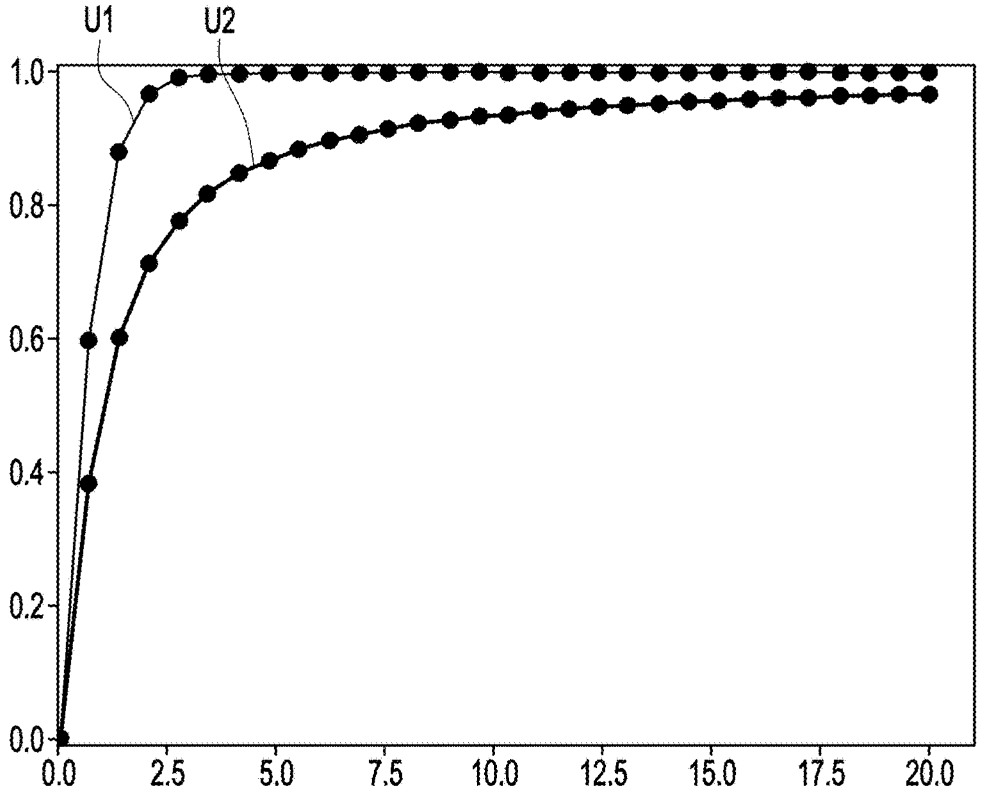
FIG. 2B is a schematic diagram of different first functions in an adaptive illumination system according to an embodiment of the present disclosure.

FIG. 2A is a schematic diagram of different second functions in an adaptive illumination system according to an embodiment of the present disclosure. FIG. 2B is a schematic diagram of different first functions in an adaptive illumination system according to an embodiment of the present disclosure. In the figures, the horizontal axis represents time in unit of ms; the vertical axis represents normalized light intensity (that is, 1.0 represents the highest brightness).

Please refer to FIG. 2A and FIG. 2B. In a preferred embodiment, the dimming function DF is a smooth function. Moreover, when the controller 300 increases or reduces the brightness of each of the light sources 100, the absolute value of the slope of the brightness changing over time gradually decreases.

Specifically, in this embodiment, the dimming function DF includes first functions U1 and U2 as well as second functions D1 and D2. The controller 300 increases the brightness of each of the light sources 100 through the first functions U1 and U2, and reduces the brightness of each of the light sources 100 through the second functions D1 and D2. For example, the second function D1 is $1-\tanh(x)$, and the second function D2 is $1-(\arctan(x)\times 2/\pi)$. The first function U1 is $\tanh(x)$, and the first function U2 is $\arctan(x)\times 2/\pi$. In other words, a smooth function is used as the dimming function DF, so that the adaptive illumination system 10 may provide smooth brightness changes during the dimming process. Moreover, a dimming method is further used to gradually reduce the absolute value of the slope of the changes in brightness over time, which provides smooth brightness changes during the dimming process and further helps reduce the impact of the illumination beam IL on the drivers and other vehicles, thereby improving driving safety.

Figure 3:
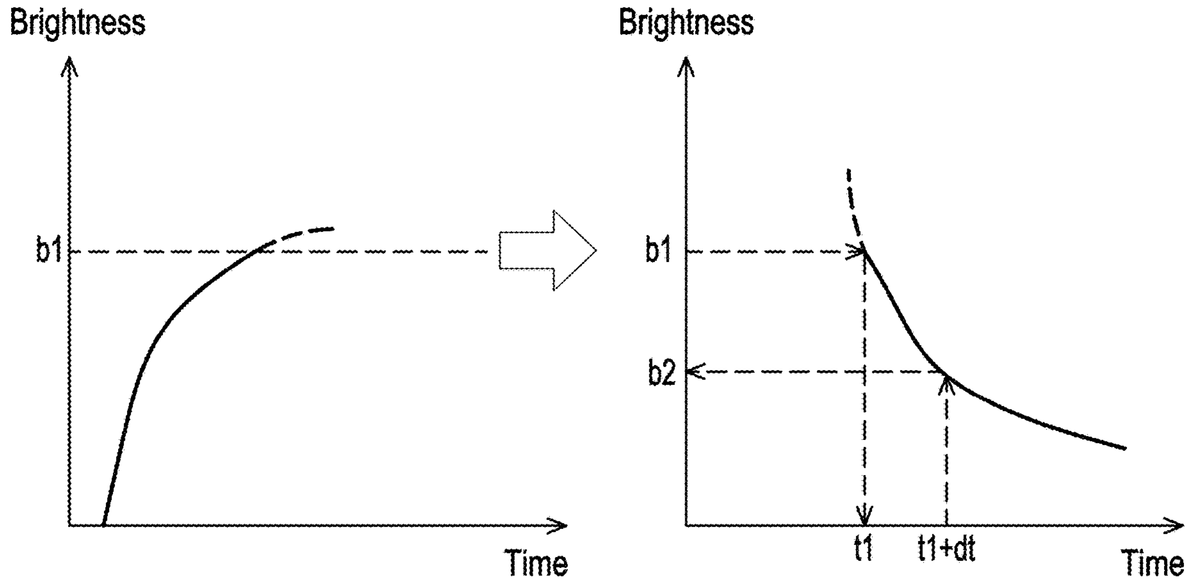
FIG. 3 is a schematic diagram of switching the brightness of a light source from high to low in an adaptive illumination system according to an embodiment of the present disclosure.

FIG. 3 is a schematic diagram of switching the brightness of a light source from high to low in an adaptive illumination system according to an embodiment of the present disclosure. Please refer to FIG. 3. In this embodiment, in response to switching from increasing the brightness of each of the light sources 100 to decreasing the brightness of each of the light sources 100, the controller 300 calculates the brightness of each of the light sources 100 to be dimmed next time under the dimming frequency of the second functions D1 and D2 based on the current brightness of each of the light sources 100 and the inverse functions of the second functions D1 and D2. Moreover, in response to switching from reducing the brightness of each of the light sources 100 to increasing the brightness of each of the light sources 100, the controller 300 calculates the brightness of each of the light sources 100 to be dimmed next time under the dimming frequency of the first functions U1 and U2 according to the current brightness of each of the light sources 100 and the inverse functions of the first functions U1 and U2.

For example, the left part of FIG. 3 shows that the light sources 100 of the adaptive illumination system 10 are in the process of increasing the brightness. However, when the brightness of the light sources 100 is increased to b1, the environmental information EI changes (for example, other vehicles will enter the illumination region illuminated by the light sources 100), causing the light sources 100 to be switched to reduced brightness. Using the inverse functions of the second functions D1 and D2 and the current brightness of the light sources 100 (that is, b1), it is possible to calculate the corresponding time t1 at the brightness b1. Therefore, based on the dimming frequency (i.e., 1/dt) of the second functions D1 and D2, it is possible to calculate the brightness b2 to be dimmed next time. That is to say, through the current brightness of the light sources 100, the inverse function of the dimming function DF and the dimming frequency, the brightness change of the light sources 100 during the process of switching from high to low or from low to high may be smooth and uninterrupted.

Figure 4A:
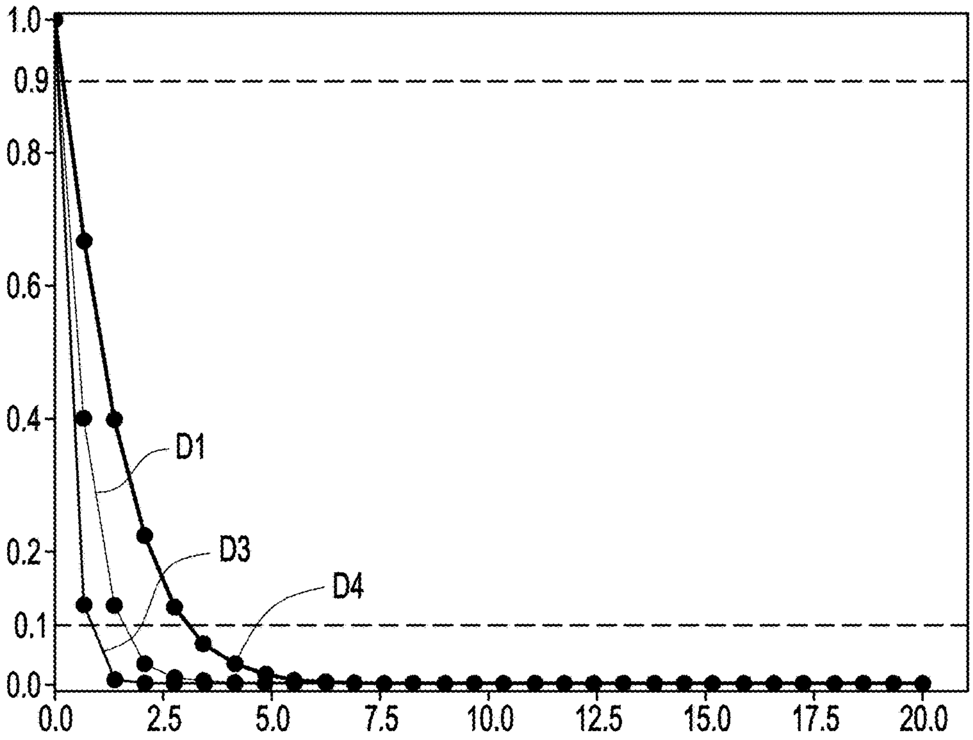
FIG. 4A is a schematic diagram of a second function with different dimming times in an adaptive illumination system according to an embodiment of the present disclosure.
Figure 4B:
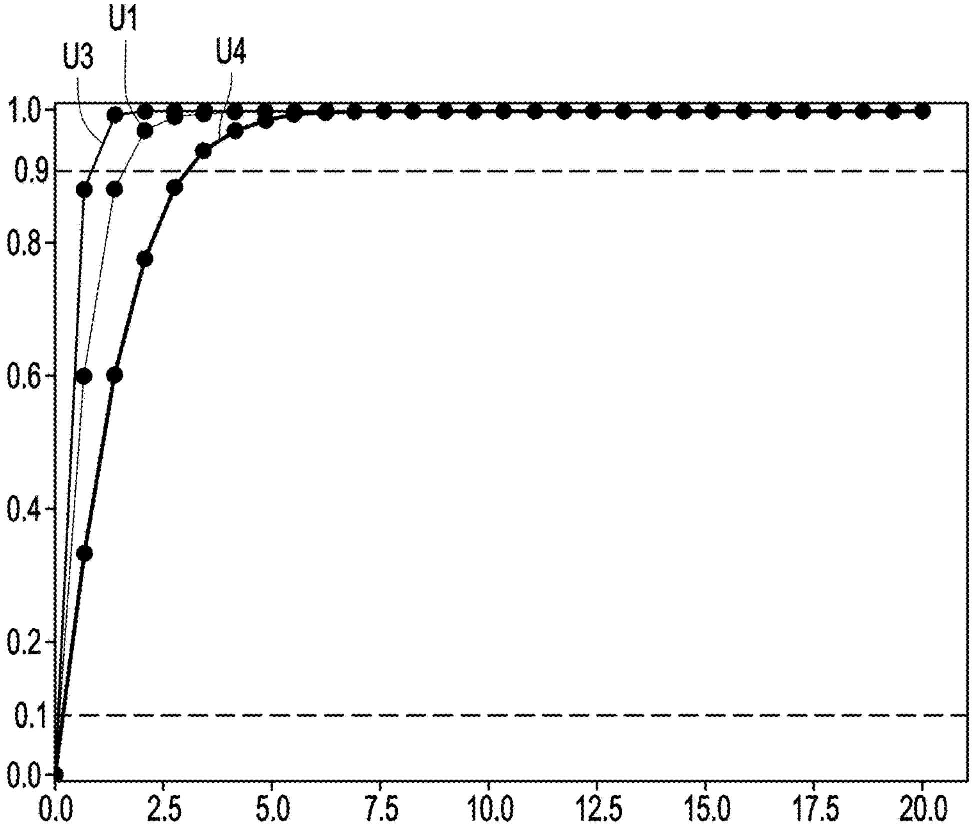
FIG. 4B is a schematic diagram of a first function with different dimming times in an adaptive illumination system according to an embodiment of the present disclosure.

FIG. 4A is a schematic diagram of a second function with different dimming times in an adaptive illumination system according to an embodiment of the present disclosure. FIG. 4B is a schematic diagram of a first function with different dimming times in an adaptive illumination system according to an embodiment of the present disclosure. In the figures, the horizontal axis represents time in unit of ms; the vertical axis represents normalized light intensity.

Please refer to FIG. 4A and FIG. 4B. In this embodiment, the controller 300 determines the parameters of the dimming function DF according to the dimming time to control the increasing and reducing speeds of the brightness of each of the light sources 100. The dimming time is the time required for the brightness to increase from the lower limit of brightness to the upper limit of brightness or the time required for the brightness to reduce from the upper limit of brightness to the lower limit of brightness. The lower limit of brightness and the upper limit of brightness may be set to 10% and 90% of the maximum brightness, for example, but the disclosure is not limited thereto. That is to say, the slopes (corresponding to the parameters of the dimming function DF) of the first functions U1 and U2 as well as the second functions D1 and D2 in the dimming function may be adjusted according to the long or short dimming time, so that the increasing speed and reducing speed of the brightness may be adjusted accordingly.

For example, the first functions U1, U3, and U4 are tanh(ax), the second functions D1, D3, and D4 are 1−tanh (ax), x denotes time, and a denotes the parameter of the dimming function DF. Therefore, the dimming parameters shown in Table 1 below may be obtained through the following relationship:

$$\text{Dimming time} = (\text{arctanh}(0.9) - \text{arctanh}(0.1))/a \approx 1.3718/a$$

TABLE 1

| a | Dimming time (ms) |
|---|---|
| 2 | 0.6859 |
| 1 | 1.3718 |
| ½ | 2.7437 |

Figure 5A:
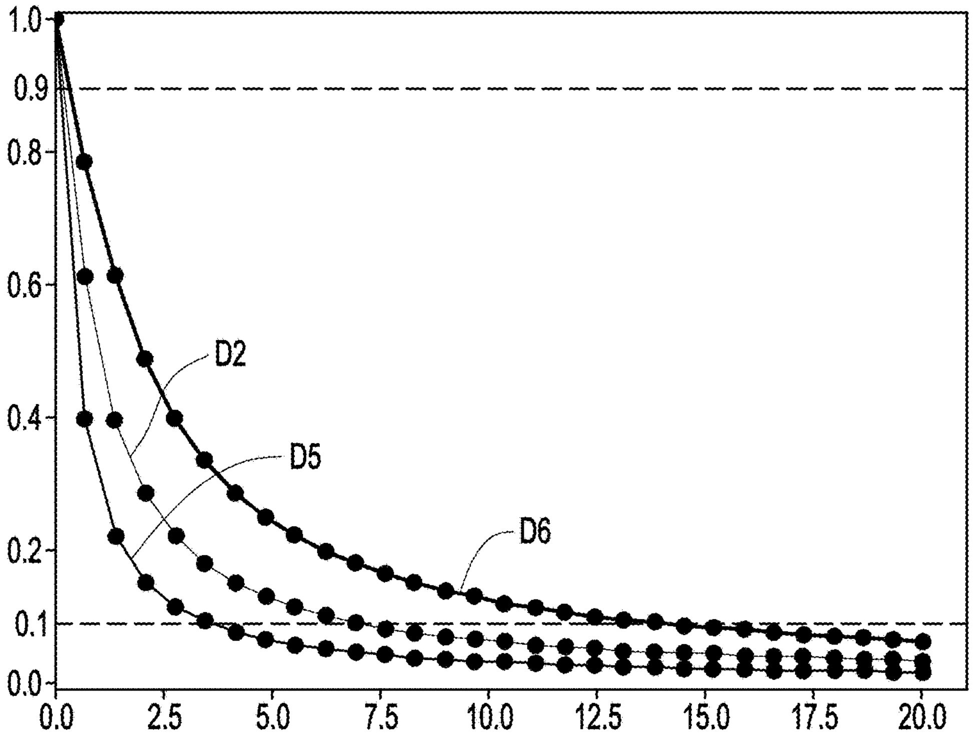
FIG. 5A is another schematic diagram of a second function with different dimming times in an adaptive illumination system according to an embodiment of the present disclosure.
Figure 5B:
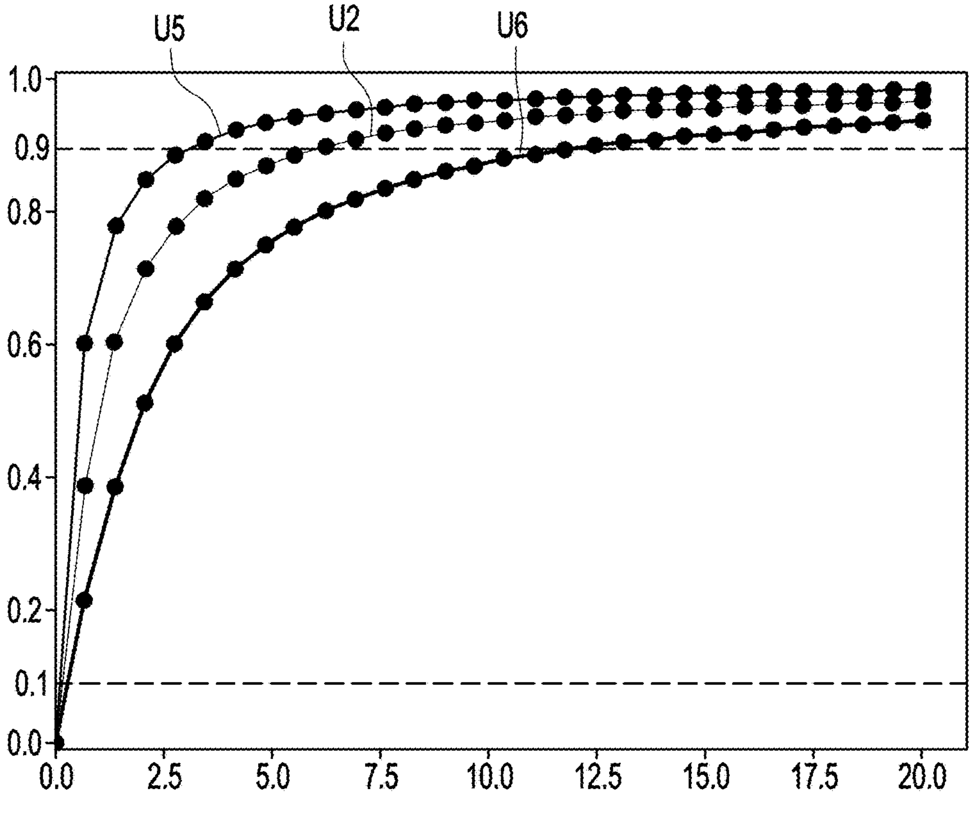
FIG. 5B is another schematic diagram of a first function with different dimming times in an adaptive illumination system according to an embodiment of the present disclosure.

FIG. 5A is another schematic diagram of a second function with different dimming times in an adaptive illumination system according to an embodiment of the present disclosure. FIG. 5B is another schematic diagram of a first function with different dimming times in an adaptive illumination system according to an embodiment of the present disclosure. In the figures, the horizontal axis represents time in unit of ms; the vertical axis represents normalized light intensity.

Please refer to FIG. 5A and FIG. 5B. The first functions U2, U5, and U6 are arctan(ax)×2/π, and the second functions D2, D5, and D6 are 1−(arctan(ax)×2/π), x denotes time, a denotes the parameter of dimming function DF. Therefore, the dimming parameters shown in Table 2 below may be obtained through the following relationship:

$$\text{Dimming time} = \left(\tan\left(0.9 \times 2/\pi\right) - \tan\left(0.1 \times 2/\pi\right)\right)/a \approx 6.1553/a$$

TABLE 2

| a | Dimming time (ms) |
|---|---|
| 2 | 3.0776 |
| 1 | 6.1553 |
| ½ | 12.3107 |

Figure 6:
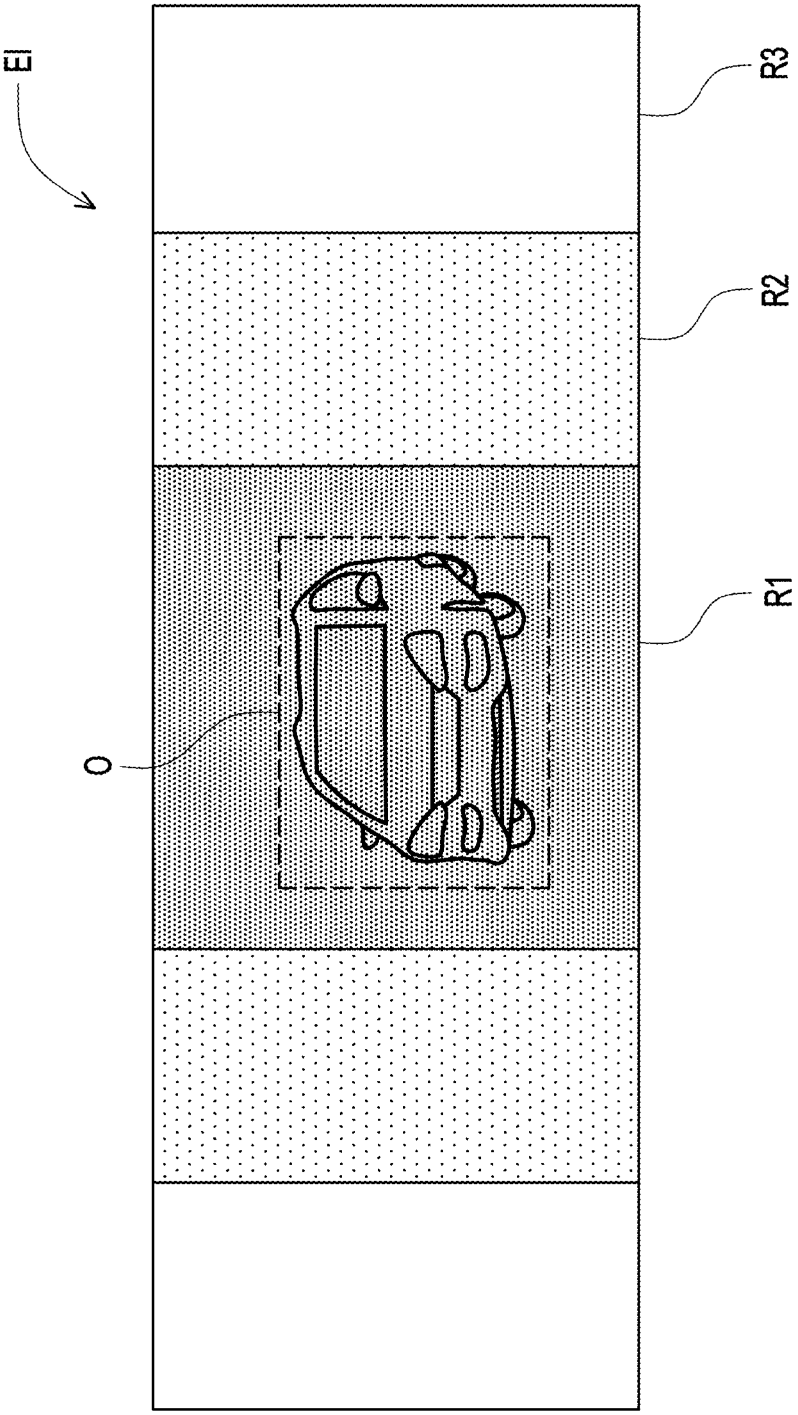
FIG. 6 is a schematic diagram of environmental information obtained by an adaptive illumination system according to an embodiment of the present disclosure.
Figure 7A:
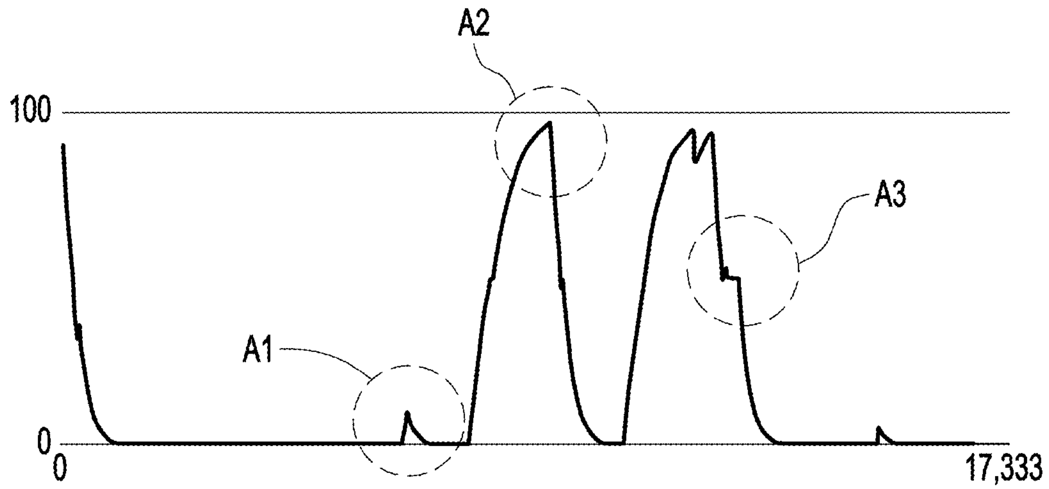
FIG. 7A and FIG. 7B are schematic diagrams respectively showing different light sources being dimmed according to the environmental information of FIG. 6.
Figure 7B:
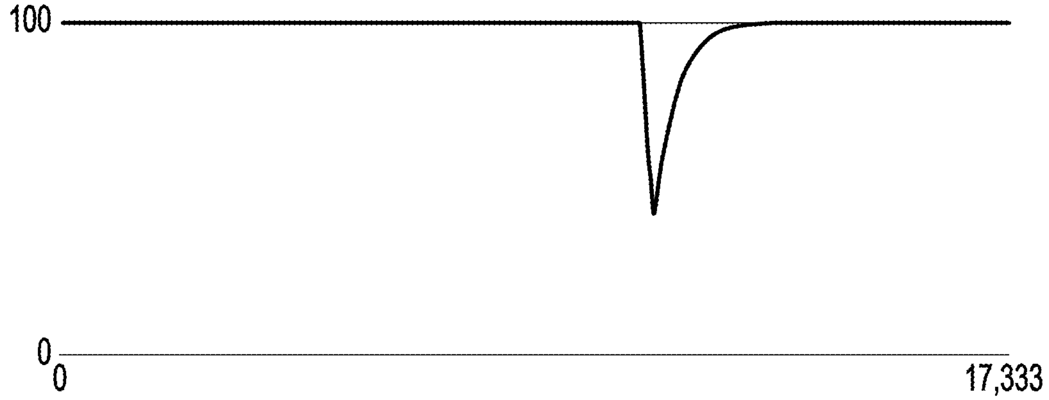
Figure 8A:
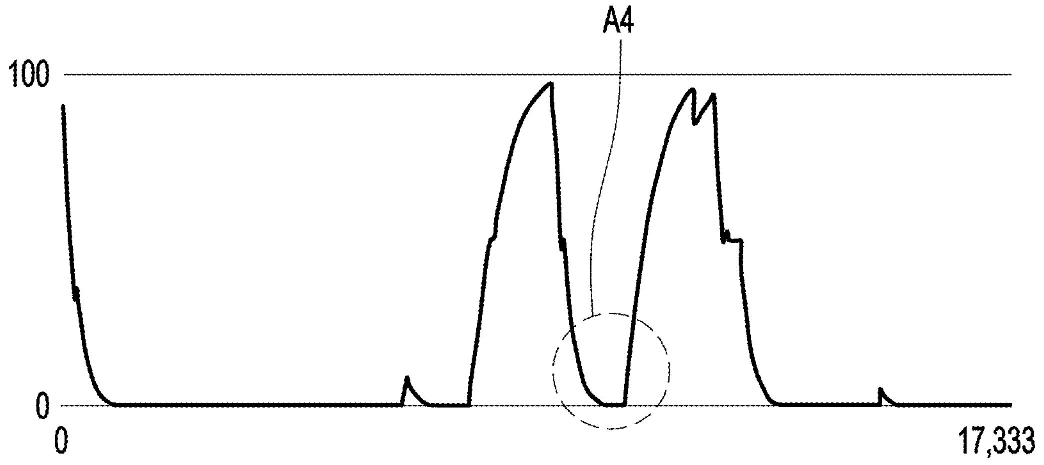
FIG. 8A and FIG. 8B are schematic diagrams respectively showing light sources with different dimming times being dimmed according to the environmental information of FIG. 6.
Figure 8B:
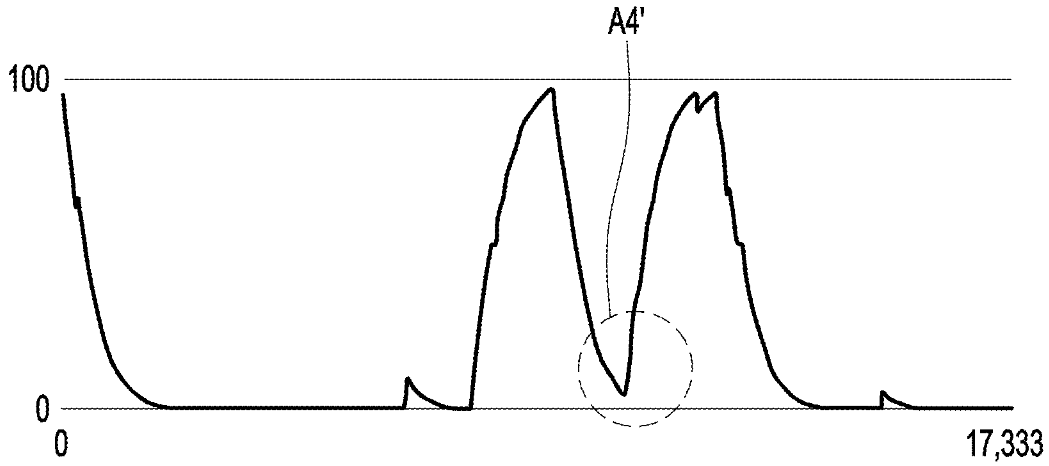
Figure 8C:
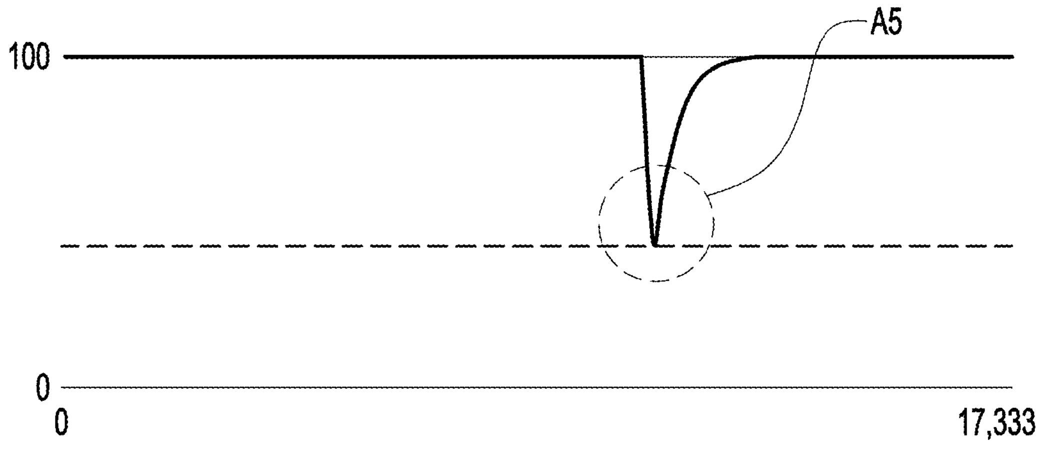
FIG. 8C and FIG. 8D are schematic diagrams respectively showing light sources with different dimming times being dimmed according to the environmental information of FIG. 6 relative to the different light sources of FIG. 8A and FIG. 8B.
Figure 8D:
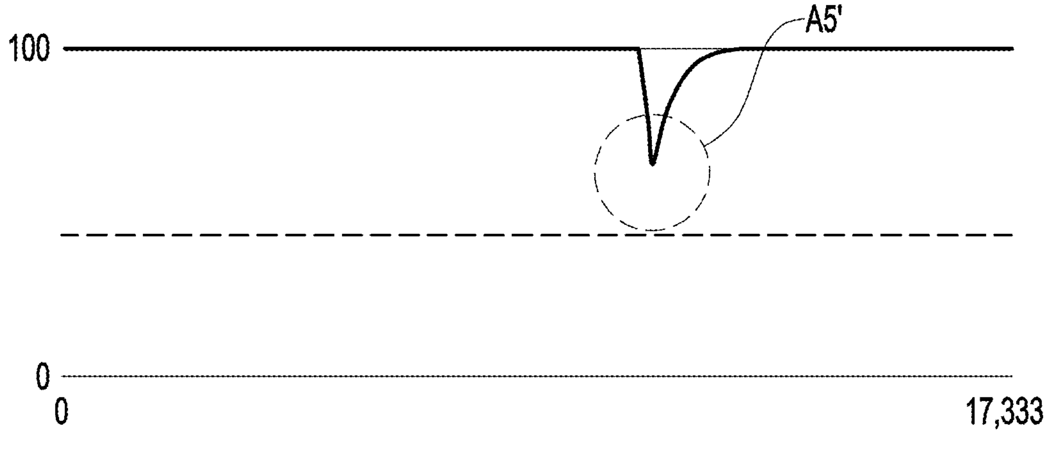

FIG. 6 is a schematic diagram of environmental information obtained by an adaptive illumination system according to an embodiment of the present disclosure. FIG. 7A and FIG. 7B are schematic diagrams respectively showing different light sources being dimmed according to the environmental information of FIG. 6. FIG. 8A and FIG. 8B are schematic diagrams respectively showing light sources with different dimming times being dimmed according to the environmental information of FIG. 6. FIG. 8C and FIG. 8D are schematic diagrams respectively showing light sources with different dimming times being dimmed according to the environmental information of FIG. 6 relative to the different light sources of FIG. 8A and FIG. 8B. In FIG. 6, the environmental information EI includes an object O, such as a vehicle. In FIG. 7A to FIG. 8D, the horizontal axis represents time in unit of ms; the vertical axis represents relative light intensity, that is, light intensity ranges from 0% to 100%.

Please refer to FIG. 6 to FIG. 7B first. The image of the environmental information EI in FIG. 6 may be roughly divided into regions R1, R2, and R3. When the light sources 100 illuminate the regions R1, R2, and R3 respectively, the brightness of the light sources 100 is preferably 0%, 50%, and 100%. In FIG. 7A, at the beginning, the object O is detected in the illumination region illuminated by the light sources 100, and the brightness of the light sources 100 drops to 0%. Next, in the range A1, when the object O leaves the illumination region, the brightness begins to increase. However, because the system detects other objects, the brightness is reduced again. The situation of range A2 is similar to that of range A1 and will not be described again. In range A3, the illumination region (such as region R2) illuminated by the light sources happens to be adjacent to the object O, so the brightness is first increased to 50%; when the object O enters the illumination region, the light sources are reduced to 0%.

Please refer to FIG. 8A to FIG. 8D again. In FIG. 8A and FIG. 8B, the light sources are the same but dimming times are different. In FIG. 8C and FIG. 8D, there are other light sources, and the dimming times are different. In FIG. 8A and FIG. 8C, the dimming time of the first function is set to 1000 ms, and the dimming time of the second function is set to 500 ms. In FIG. 8B and FIG. 8D, the dimming time of the first function is set to 1000 ms, and the dimming time of the second function is set to 1000 ms. In the ranges A4 and A4', because the dimming time of the second function in FIG. 8A is short, the brightness in the range A4 drops to 0% quickly, while the brightness in the range A4' starts to increase before dropping to 0%. Likewise, the brightness in the range A5 decreases faster, and the brightness in the range A5' decreases slower.

Figure 9A:
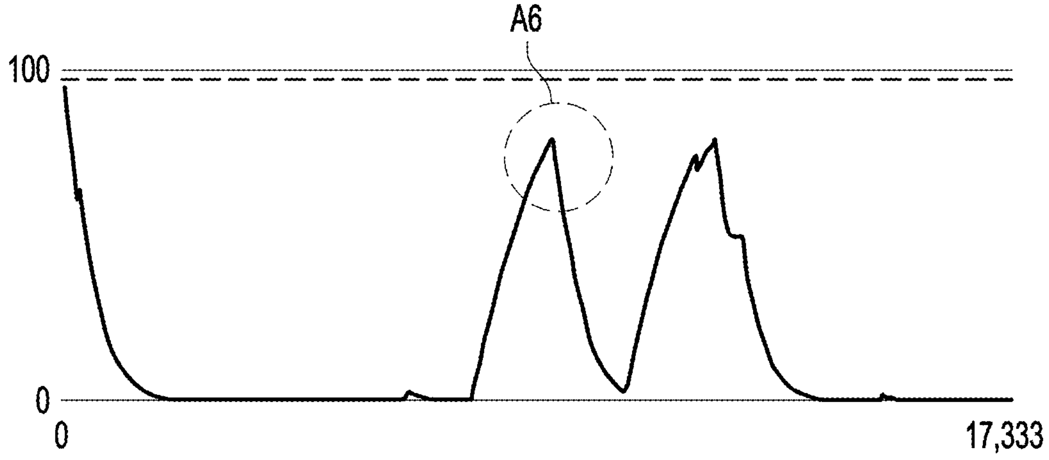
FIG. 9A and FIG. 9B are other schematic diagrams respectively showing light sources with different dimming times being dimmed according to the environmental information of FIG. 6.
Figure 9B:
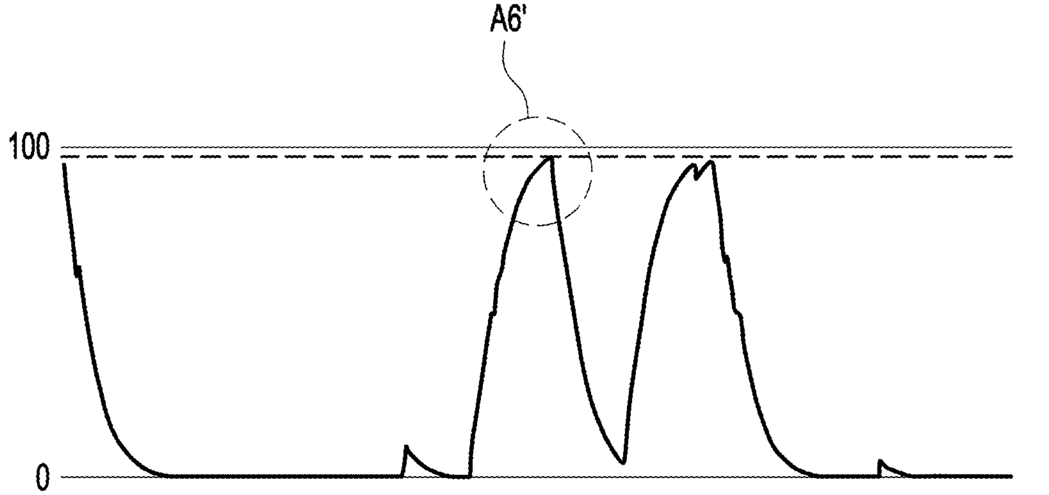
Figure 9C:
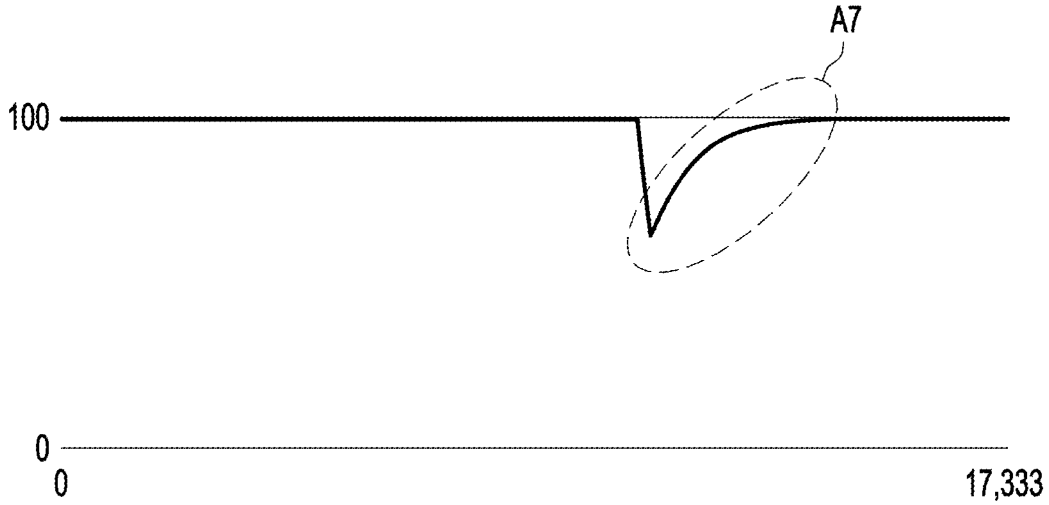
FIG. 9C and FIG. 9D are schematic diagrams respectively showing light sources with different dimming times being dimmed according to the environmental information of FIG. 6 relative to the different light sources of FIG. 9A and FIG. 9B.
Figure 9D:
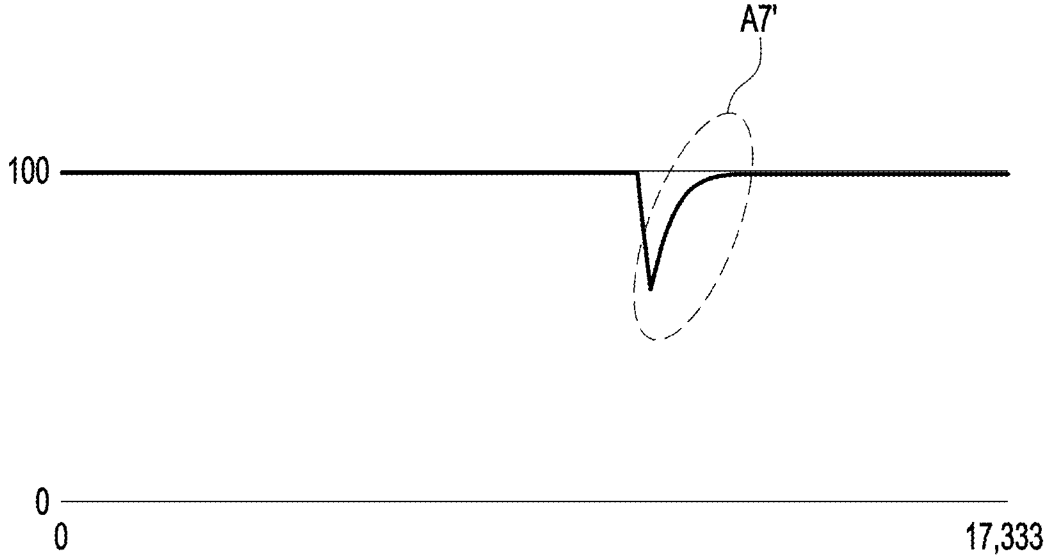

FIG. 9A and FIG. 9B are other schematic diagrams respectively showing light sources with different dimming times being dimmed according to the environmental information of FIG. 6. FIG. 9C and FIG. 9D are schematic diagrams respectively showing light sources with different dimming times being dimmed according to the environmental information of FIG. 6 relative to the different light sources of FIG. 9A and FIG. 9B. Please refer to FIG. 6 and FIG. 9A to FIG. 9D. In FIG. 9A and FIG. 9B, the light sources are the same but dimming times are different. In FIG. 9C and FIG. 9D, there are other light sources, and the dimming times are different. In FIG. 9A and FIG. 9C, the dimming time of the first function is set to 2000 ms, and the dimming time of the second function is set to 1000 ms. In FIG. 9B and FIG. 9D, the dimming time of the first function is set to 1000 ms, and the dimming time of the second function is set to 1000 ms.

In the ranges A6 and A6', because the dimming time of the first function in FIG. 9B is short, the brightness in the range A6' rises faster, while the brightness in the range A6 rises slower. Likewise, the brightness in the range A7' rises faster and has a steeper slope, while the brightness in the range A7 rises slower and has a gentler slope.

Figure 10:
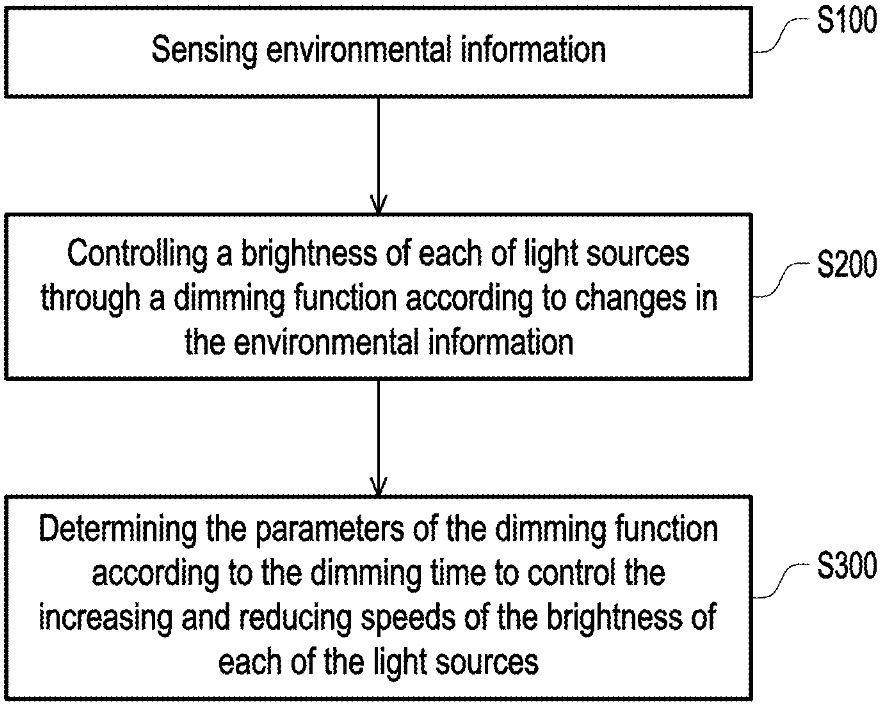
FIG. 10 is a flow chart of a dimming method of an adaptive illumination system according to an embodiment of the present disclosure.

FIG. 10 is a flow chart of a dimming method of an adaptive illumination system according to an embodiment of the present disclosure. Please refer to FIG. 10. An embodiment of the present disclosure provides a dimming method of an adaptive illumination system 10, which includes the following steps. In step S100, the environmental information EI is sensed. In step S200, the brightness of each of the light sources 100 is controlled through the dimming function DF according to changes in the environmental information EI.

Figure 11:
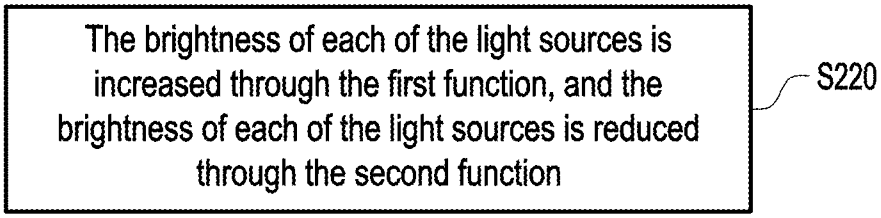
FIG. 11 to FIG. 13 are detailed process flowcharts of step S200 in FIG. 10.
Figure 12:
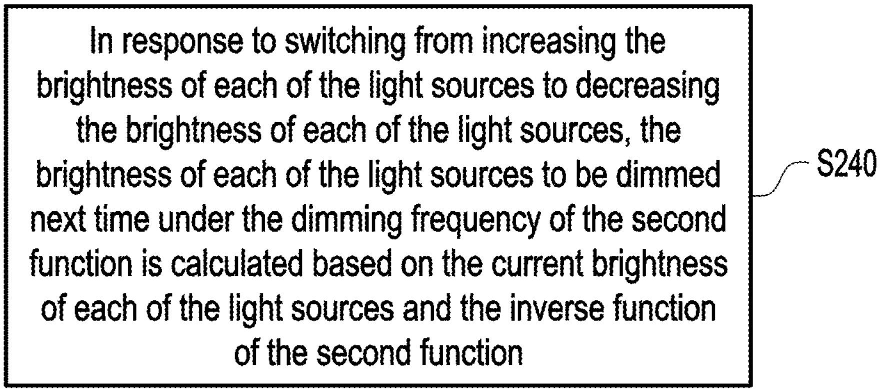
Figure 13:
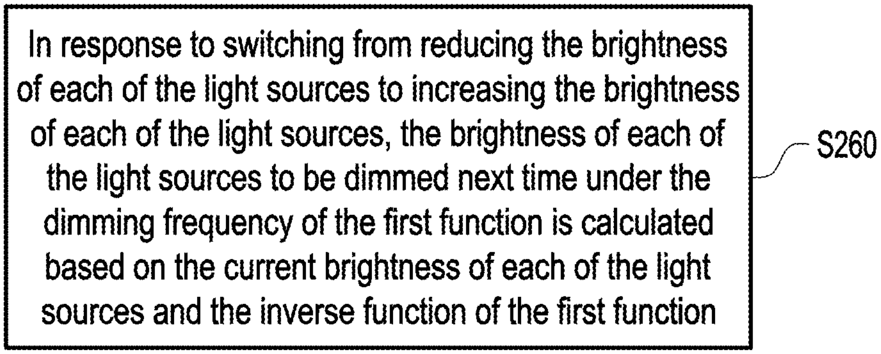

FIG. 11 to FIG. 13 are detailed process flowcharts of step S200 in FIG. 10. Please refer to FIG. 11 to FIG. 13. The above-mentioned step S200 includes the following steps. In step S220, the brightness of each of the light sources 100 is increased through the first functions U1, U2, U3, U4, U5, and U6, and the brightness of each of the light sources 100 is reduced through the second functions D1, D2, D3, D4, D5, and D6.

The above step S200 further includes the following steps. In step S240, in response to switching from increasing the brightness of each of the light sources 100 to decreasing the brightness of each of the light sources 100, the brightness of each of the light sources 100 to be dimmed next time under the dimming frequency of the second functions D1, D2, D3, D4, D5 and D6 is calculated based on the current brightness of each of the light sources 100 and the inverse functions of the second functions D1, D2, D3, D4, D5 and D6. In step S260, in response to switching from reducing the brightness of each of the light sources 100 to increasing the brightness of each of the light sources 100, the brightness of each of the light sources 100 to be dimmed next time under the dimming frequency of the first functions U1, U2, U3, U4, U5 and U6 is calculated based on the current brightness of each of the light sources 100 and the inverse functions of the first functions U1, U2, U3, U4, U5 and U6.

Please refer to FIG. 10 again. In this embodiment, the dimming method of the adaptive illumination system 10 further includes the following steps. In step S300, the parameters of the dimming function DF are determined according to the dimming time to control the increasing and reducing speeds of the brightness of each of the light sources 100.

Based on the above, in an embodiment of the present disclosure, the adaptive illumination system and the dimming method thereof sense environmental information, and then control a brightness of each light source through a dimming function according to changes in the environmental information, and set the dimming function as a nonlinear function. In this way, using nonlinear mathematical functions allows the adaptive illumination system and the dimming method thereof to achieve nonlinear brightness control.

What is claimed is:

1. An adaptive illumination system, comprising:
 a plurality of light sources configured to emit a plurality of illumination beams;
 a sensing module configured to sense environmental information; and
 a controller electrically connected to the plurality of light sources and the sensing module,
 wherein the controller controls a brightness of each of the plurality of light sources through a dimming function based on a plurality of changes in the environmental information,
 wherein the controller controls a brightness of each of the plurality of light sources through a dimming function based on a plurality of changes in the environmental information, the controller determines parameters of the dimming function based on a dimming time to control increasing and reducing speeds of the brightness of each of the plurality of light sources, wherein the dimming time is a time required for the brightness to increase from a lower limit of the brightness to an upper limit of the brightness or a time required for the brightness to reduce from the upper limit of the brightness to the lower limit of the brightness, the lower limit of the brightness is 10% and the upper limit of the brightness is 90% of a maximum brightness of each of the plurality of light sources.

2. The adaptive illumination system according to claim 1, wherein the dimming function is a nonlinear function.

3. The adaptive illumination system according to claim 2, wherein the dimming function is a smooth function.

4. The adaptive illumination system according to claim 1, wherein in response to the controller increasing or reducing the brightness of each of the plurality of light sources, an absolute value of a slope of the brightness changing over time gradually decreases.

5. The adaptive illumination system according to claim 1, wherein the controller is a central processing unit, a microprocessor, a digital signal processor, a programmable controller, a programmable logic device, or a graphic processing unit.

6. The adaptive illumination system according to claim 1, wherein the sensing module is a camera module, a millimeter wave radar module, an ultrasonic radar module, or a light detection and ranging (LiDAR) module.

7. A dimming method for an adaptive illumination system, comprising:
 sensing environmental information;
 controlling a brightness of each of a plurality of light sources through a dimming function based on a plurality of changes in the environmental information; and
 determining parameters of the dimming function based on a dimming time to control increasing and reducing speeds of the brightness of each of the light sources, wherein the dimming time is a time required for the brightness to increase from a lower limit of the brightness to an upper limit of the brightness or a time required for the brightness to reduce from the upper limit of the brightness to the lower limit of the brightness, the lower limit of the brightness is 10% and the upper limit of the brightness is 90% of a maximum brightness of each of the plurality of light sources.

8. The dimming method for the adaptive illumination system according to claim 7, wherein the dimming function is a nonlinear function.

9. The dimming method for the adaptive illumination system according to claim 8, wherein the dimming function is a smooth function.

10. The dimming method for the adaptive illumination system according to claim 7, wherein in response to increasing or reducing the brightness of each of the light sources, an absolute value of a slope of the brightness changing over time gradually decreases.

11. The dimming method for the adaptive illumination system according to claim 7, wherein sensing environmental information is by a controller, and the controller is a central processing unit, a microprocessor, a digital signal processor, a programmable controller, a programmable logic device, or a graphic processing unit.

12. The dimming method for the adaptive illumination system according to claim 7, wherein controlling a brightness of each of light sources through a dimming function is by a sensing module, the sensing module is a camera module, a millimeter wave radar module, an ultrasonic radar module, or a light detection and ranging (LiDAR) module.

13. The adaptive illumination system according to claim 1, wherein the plurality of light sources are light-emitting diodes (LEDs).

14. The adaptive illumination system according to claim 1, wherein the adaptive illumination system further includes a transmission module.

15. The adaptive illumination system according to claim 1, wherein the plurality of light sources are arranged in a matrix.

16. The adaptive illumination system according to claim 1, wherein environmental information includes a plurality of vehicles, a plurality of traffic signs, a plurality of pedestrians, or a plurality of trees.

17. The adaptive illumination system according to claim 1, wherein dimming time is 1000 ms.

18. The adaptive illumination system according to claim 1, wherein dimming time is 500 ms.

19. The adaptive illumination system according to claim 7, wherein dimming time is 1000 ms.

20. An adaptive illumination system, comprising:

a plurality of light sources configured to emit a plurality of illumination beams;

a sensing module configured to sense environmental information; and a controller electrically connected to the plurality of light sources and the sensing module, wherein the controller controls a brightness of each of the plurality of light sources through a dimming function based on a plurality of changes in the environmental information, wherein the dimming function includes a first function and a second function, wherein the controller increases the brightness of each of the plurality of light sources through the first function, and decreases the brightness of each of the plurality of light sources through the second function, wherein when the second function is $1-\tanh(x)$, the second function is $1-(\arctan(x)\times 2/\pi)$, and when the first function is $\tanh(x)$, the second function is $\arctan(x)\times 2/\pi$, wherein in response to switching from increasing the brightness of each of the plurality of light sources to decreasing the brightness of each of the plurality of light sources, the controller calculates a brightness of each of the plurality of light sources to be dimmed next time under a dimming frequency of the second function based on a current brightness of each of the plurality of light sources and an inverse function of the second function.

* * * * *